United States Patent [19]

Lenart

[11] Patent Number: 4,769,813

[45] Date of Patent: Sep. 6, 1988

[54] RING COMMUNICATION SYSTEM

[75] Inventor: Joseph M. Lenart, Arlington, Mass.

[73] Assignee: GTE Laboratories Incorporated, Waltham, Mass.

[21] Appl. No.: 122,299

[22] Filed: Nov. 18, 1987

[51] Int. Cl.$^4$ .......................... H04J 3/02; H04Q 11/04

[52] U.S. Cl. ........................................ 370/86; 370/60; 370/88

[58] Field of Search ....................... 370/85, 86, 88, 94, 370/60

[56]  References Cited

U.S. PATENT DOCUMENTS

| | | | |
|---|---|---|---|
| 4,554,659 | 11/1985 | Blood et al. | 370/86 |
| 4,558,428 | 12/1985 | Matsumura et al. | 370/86 |
| 4,569,041 | 2/1986 | Takeuchi et al. | 370/86 |

Primary Examiner—Douglas W. Olms
Assistant Examiner—Wellington Chin
Attorney, Agent, or Firm—David M. Keay

[57] ABSTRACT

Communication systems of a plurality of switching nodes connected in a closed ring. A switching stage at each node transmits words of data from node-to-node in a time-division multiplexed data stream. Data can be inserted onto the ring by each switching stage, and data addressed to a switching stage is removed from the ring by that switching stage. Data words are loaded into input registers at each switching stage on the leading edge of a clock pulse, decoding occurs within each switching stage during the clock pulse, and the data words are placed in the proper output registers of each switching stage in response to the termination of the clock pulse.

14 Claims, 4 Drawing Sheets

| CONDITION | INPUTS | | | | OUTPUTS | | | | | ACTIONS |
|---|---|---|---|---|---|---|---|---|---|---|
| | 1= | $S_{1i}$ | $S_{xi}$ | X= | $S_{1o}$ | $S_{xo}$ | M | $G_2$ | $G_1$ | |
| 1 | 0 | 0 | 0 | 0 | 0 | 0 | 1 or 0 | 1 | 1 | 0 to $T_{xo}$ — NULL |
| 2 | 0 | 0 | 1 | 0 | 0 | 1 | 0 | 1 | 1 | $T_{xi}$ to $T_{xo}$ — PASS THROUGH |
| 3 | 0 | 0 | 1 | 1 | 1 | 0 | 1 | 0 | 1 | $T_{xi}$ to $T_{1o}$ / 0 to $T_{xo}$ — DROP / NULL |
| 4 | 0 | 1 | 0 | 0 | 0 | 1 | 1 | 1 | 0 | $T_{1i}$ to $T_{xo}$ — INSERT |
| 5 | 0 | 1 | 1 | 0 | 0 | 1 | 0 | 1 | 1 | $T_{xi}$ to $T_{xo}$ — PASS THROUGH (HOLD $T_{1i}$) |
| 6 | 0 | 1 | 1 | 1 | 1 | 1 | 1 | 0 | 0 | $T_{xi}$ to $T_{1o}$ / $T_{1i}$ to $T_{xo}$ — DROP / INSERT |
| 7 | 1 | 1 | 0 | 0 | 1 | 0 | 0 | 0 | 0 | 0 to $T_{xo}$ / $T_{1i}$ to $T_{1o}$ — NULL / PASS THROUGH |
| 8 | 1 | 1 | 1 | 0 | 1 | 1 | 0 | 0 | 0 | $T_{xi}$ to $T_{xo}$ / $T_{1i}$ to $T_{1o}$ — PASS THROUGH / PASS THROUGH |
| 9 | 1 | 1 | 1 | 1 | 1 | 0 | 1 | 0 | 1 | $T_{xi}$ to $T_{1o}$ — DROP (HOLD $T_{1i}$) |

Fig. 3.

RING COMMUNICATION SYSTEM

CROSS-REFERENCE TO RELATED APPLICATION

This application is related to application Ser. No. 122,298 filed concurrently herewith by Joseph M. Lenart entitled, "Time-Division Multiplexed Communication Apparatus" and assigned to the assignee of the present application.

BACKGROUND OF THE INVENTION

This invention relates to communication systems. More particularly, it is concerned with communication systems employing a network of switching stages connected in a closed ring.

Ring communication systems generally include a plurality of switching nodes intercoupled in a ring with ring transmission paths interconnecting the nodes for transmitting data from node to node around the ring. Each of the switching nodes is an interface at which data may be coupled onto and off of the ring. Ring switching allows various levels of distributing or decentralizing the logic and physical control of a communication system. Ring switching systems may be structured to provide a distributed switching system in which control is dispersed to the switching stage at each individual switching node. That is, all of the control functions are performed independently and autonomously by the switching stages. Only the timing function for synchronizing the operations of the switching stages is common to all the switching stages.

In ring switching systems of this type, the individual switching stages should have low propagation delay so as to permit a large number of nodes to be incorporated in a ring, thus providing high capacity for the network. The switching stages should independently provide the necessary driving power for transmitting data therefrom both on and off the ring, thus permitting expansion without creating additional load on output devices.

SUMMARY OF THE INVENTION

Time-division multiplexed switching apparatus in accordance with the present invention includes a plurality of switching stages which are arranged in a closed ring with ring bus means connecting each switching stage to the preceding switching stage of the ring and to the succeeding switching stage of the ring. Each switching stage in the ring is designated by a unique address. Words of digitally encoded information are transmitted from one switching stage to the succeeding switching stage at a first data rate.

Each of the switching stages comprises a ring input storage means which is coupled to the ring bus means for receiving and storing a word of digitally encoded information transmitted over the ring bus means from the preceding switching stage. The ring input storage means has an input coupled to the ring bus means from the preceding switching stage and also has an output. A transfer input storage means for receiving and storing a word of digitally encoded information to be transferred onto the ring has an input coupled to a transfer input bus and also has an output. The apparatus also includes a ring output storage means for storing a word of digitally encoded information. The ring output storage means has an input and has an output which is coupled to the ring bus means to the succeeding switching stage. A transfer output storage means for storing a word of digitally encoded information has an input and an output.

A first multiplexing means has a first input coupled to the output of the ring input storage means and a second input coupled to the output of the transfer input storage means. An output of the first multiplexing means is coupled to the input of the ring output storage means. A second multiplexing means has a first input coupled to the output of the ring input storage means and a second input coupled to the output of the transfer input storage means. Its output is coupled to the input of the transfer output storage means. The apparatus also includes means for producing clock signals at the first data rate. The ring input storage means is operable to store a word received on the ring bus means from the preceding switching stage on the leading edge of each clock signal. An address means determines if a word stored in the ring input storage means is addressed to the address of the switching stage. The transfer input storage means operates to store a word received on the transfer input bus on the leading edge of a clock signal.

Control means are coupled to the first and second multiplexing means. The control means operates when a word is stored in the ring input storage means and the address means determines that the stored word is not addressed to the address of the switching stage to cause the first multiplexing means to couple the output of the ring input storage means to the input of the ring output storage means. The control means operates when a word is stored in the ring input storage means and the address means determines that the stored word is addressed to the address of the switching stage to cause the second multiplexing means to couple the output of the ring input storage means to the input of the transfer output storage means. The control means also operates when a word is stored in the transfer input storage means, unless a word is also stored in the ring input storage means and the address means determines that that word is not addressed to the address of the switching stage, to cause the first multiplexing means to couple the output of the transfer input storage means to the input of the ring output storage means. The ring output storage means operates in response to the termination of a clock signal to store a word present at its input, and the transfer output storage means operates in response to the termination of a clock signal to store a word present at its input.

BRIEF DESCRIPTION OF THE DRAWINGS

In the drawings:

FIG. 3 is a table showing relationships between signals internally of a switching stage under various conditions for explaining the operation of a switching stage of FIG. 2.

For a better understanding of the present invention together with other and further objects, advantages, and capabilities thereof, reference is made to the following disclosure and appended claims in connection with the above-described drawings.

DETAILED DESCRIPTION

Figure 1:
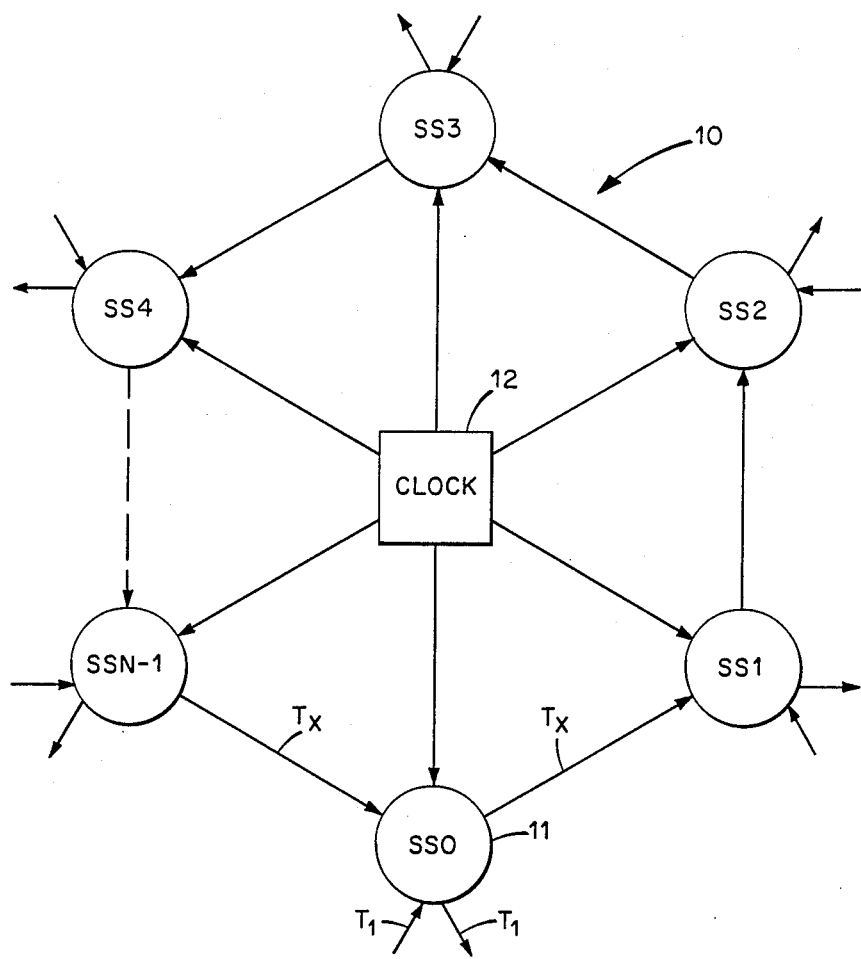
FIG. 1 is a schematic representation of a timedivision multiplexed ring switching network in accordance with the present invention.

A time-division multiplexed switching network in accordance with the present invention is illustrated schematically in FIG. 1. The switching network 10 includes N switching stages 11, one at each node, connected in series in a ring by interconnecting ring transmission paths labeled $T_X$. Each of the substantially identical switching stages 11 also receives data over an incoming communication path $T_1$ and transmits data over an outgoing communication path labeled $T_1$. Words of digitally encoded information are received at a switching stage over the incoming path $T_1$ and placed on the ring by the switching stage. Each word may be a single byte, several bytes, or any combination of bits which are handled together. The word is passed from switching stage to switching stage around the ring until it arrives at its destination switching stage where it is removed from the ring and placed on the outgoing $T_1$ path. The destination switching stage is designated by address information either contained in each word or in the first word of a message.

Words of a message may be transmitted over a $T_1$ path to a switching stage at the conventional $T_1$ rate. That is, each frame of 24 channels, or time slots, is repeated every 125 microseconds. The bits of each word are transmitted in parallel during a channel period or time slot. Each word is transmitted from node to node around the ring at a rate such that it would be propagated completely around the ring in a period of time equal to a single $T_1$ time slot or channel period. That is, the rate of transmitting data from switching stage to switching stage around the ring is equal to N times the $T_1$ rate, where N is the number of nodes or switching stages in the ring network. Timing within the switching stages of the ring is synchronized by a common clock 12 which produces a continuous series of clock pulses.

In the specific embodiment under discussion each word includes address information in addition to other data being transmitted. The address information designates the switching stage destination, each switching stage having a unique address. A status bit indicating the presence or absence of a word is associated with each word.

Figure 2:
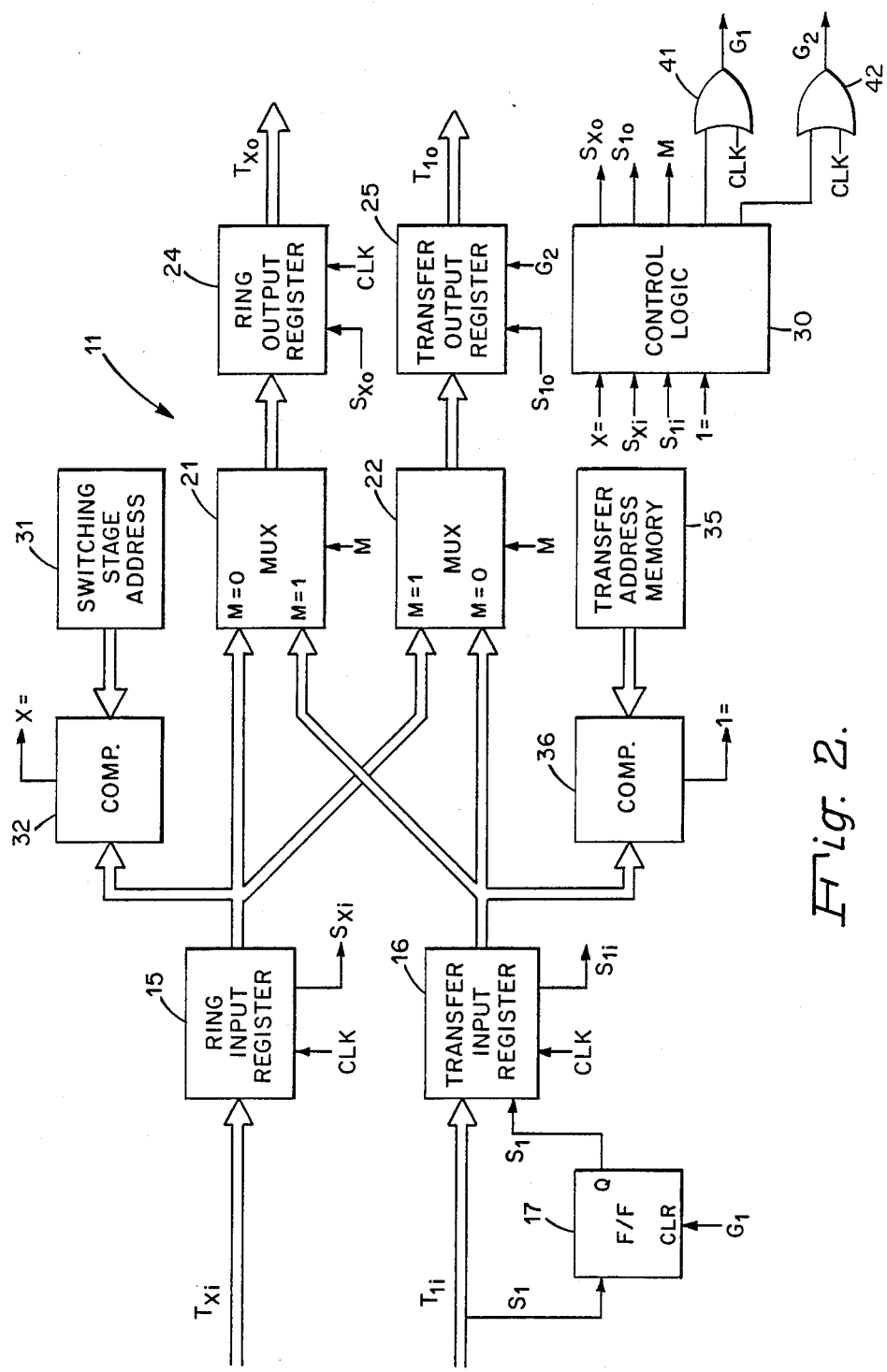
FIG. 2 is a block diagram of a single switching stage of the network of FIG. 1.
Figure 4:
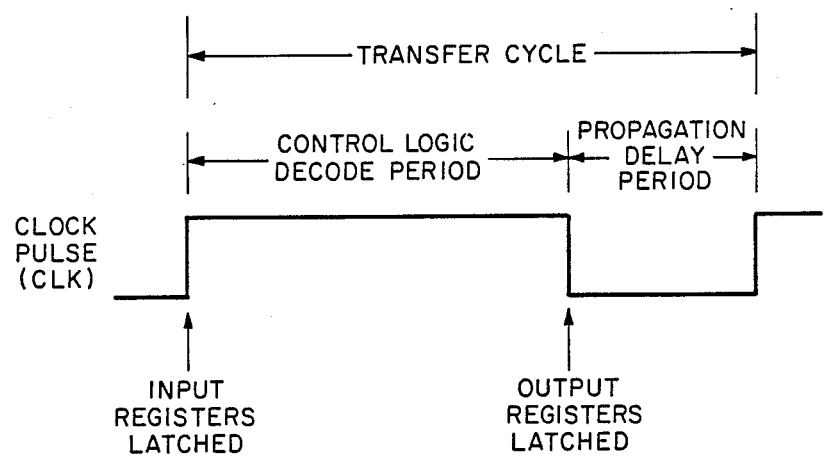
FIG. 4 is a timing diagram of a single clock pulse or operating cycle of a switching stage.

FIG. 2 is a block diagram illustrating a switching stage 11 of the network. An incoming ring bus $T_{Xi}$ from the preceding switching stage is connected to the input of a ring input register 15 for receiving and storing the bits of an incoming word in parallel. A word present on the bus $T_{Xi}$ is latched into the register 15 on the leading edge of a clock pulse, as indicated in FIG. 4. A similar register is connected to an incoming bus $T_{1i}$ and designated as the transfer input register 16. The bits of a word as incoming bus $T_{1i}$ are applied directly to the input of register 16 and the associated status bit is applied to a flip-flop 17, the function of which will be explained hereinbelow. The transfer input register 16 is also clocked to latch the word present on the $T_{1i}$ bus on the leading edge of each clock pulse.

The outputs of the ring input register 15 and of the transfer input register 16, except for the status bits, are connected to two separate sets of inputs of a first multiplexer 21 and also to two separate inputs of a second multiplexer 22. The output of the first multiplexer 21 is connected to the input of a ring output register 24 which has its output connected to the ring bus $T_{Xo}$ to the succeeding switching stage of the ring. The data at the input of the ring output register 24 is latched in the register on the trailing edge of the clock pulse, as indicated in FIG. 4.

The output of the second multiplexer 22 is connected to the input of a transfer output register 25. The output of the transfer output register 25 is connected to an outgoing bus $T_{1o}$. The transfer output register 25 is triggered to latch the data present at its input by a signal $G_2$ generated on the trailing edge of the clock pulse as indicated by FIG. 4.

The address of the individual switching stage 11 is stored in a switching stage address register 31, which may be a ROM. The address bits of a word which is stored in the ring input register 15 are compared with the address stored in the switching stage address register 31 by a comparator 32. The comparator 32 produces an appropriate output signal $X=$ designating whether or not the address of the word in the ring input register 15 is the same as the address of the switching stage. If the address in the word is not the address of the switching stage, the word is to be passed through the switching stage to the succeeding switching stage of the ring. If the address in the word is the address of the switching stage, the word is to be transferred off the ring to the bus $T_{1o}$ by way of the transfer output register 25.

As illustrated in FIG. 2, the switching stage 11 may also include a transfer address memory 35 which contains appropriate information to determine whether a word stored in the transfer input register 16 is to be transmitted on the outgoing ring bus $T_{Xo}$ or the outgoing bus $T_{1o}$. The address bits of a word stored in the transfer input register 16 are compared with the contents of the transfer address memory 35 by a comparator 36. The comparator 36 produces an output signal $1=$ designating whether the word in the transfer input register 16 is to be transferred onto the ring bus $T_{Xo}$ by way of the ring output register 24 or is to be passed to the outgoing bus $T_{1o}$ by way of the transfer output register 25. For applications in which no data is to be passed through from incoming bus $T_{1i}$ to outgoing bus $T_{1o}$, the switching stage does not require a transfer address memory 35 and a comparator 36; and if they are present, they will not be used and all words received on the transfer input but $T_{1i}$ will be transferred to the ring output bus $T_{xo}$.

Each switching stage also includes control logic 30 which receives certain information from components of the switching stage and in response thereto produces certain signals which control components to cause predetermined actions. FIG. 3 is a truth table of the possible input conditions to the control logic 30 and the resulting output signals, and includes a summary of the overall actions of the switching stage for each condition. The various signals are designated as logic 1 or logic 0 bits. Included in the data applied to the control logic 30 are the status bits $S_{Xi}$ and $S_{1i}$ indicating whether a word is present or not present in the ring input register 15 and the transfer input register 16, respectively. A status bit of logic 1 indicates the presence of the respective word and a logic 0 indicates its absence. The output signal $X=$ of the comparator 32 is a logic 1 if there is a match between the address information of the word in the ring input register 15 and the address of the switching stage as stored in the switching stage address register 31. Otherwise $X=$ is logic 0. The output $1=$ of the comparator 36 is a logic 1 only if the word in the transfer input register 16 is identified as a word to be loaded into the transfer output register 25. Otherwise $1=$ is logic 0. The elimination of the transfer address memory 35 and the comparator 36 is equivalent to 1= being 0.

In response to these input bits the control logic 30 produces a set of output bits. A status bit $S_{xo}$ to the ring output register 24 is a logic 1 if a word is to be loaded into the ring output register 24, and otherwise is a logic 0. Similarly, a status bit $S_{1o}$ to the transfer output register 25, is a logic 1 if a word is to loaded into the transfer output register 25, and otherwise is a logic 0. A multiplexer control signal M to the multiplexers 21 and 22 is either a logic 1 or logic 0. The control logic 30 also produces signals to OR gates 41 and 42 which are inhibited during a clock pulse and produce signals $G_1$ and $G_2$ on termination of the clock pulse. Signal $G_2$ controls the latching of words into the transfer output register 25. Signal $G_1$ resets the flip-flop 17 to change the status bit $S_1$ stored in the transfer input register 16. Both bits $G_1$ and $G_2$ are active at the 0 logic levels, and more specifically on changing to logic 0 on the trailing edge of a clock pulse.

The $S_{Xo}$ bit from the control logic 30 is a logic 1 if a word is to be loaded into the ring output register 24, whether or not the word is from the ring input register 15 or the transfer input register 16, and is a logic 0 if no word is to be loaded into the ring output register 24. Similarly, the status bit $S_{1o}$ to the transfer output register 25 is a logic 1 if a word is to be loaded into the transfer output register 25 from either the ring input register 15 or the transfer input register 16, and is a logic 0 if no word is to be loaded into the transfer output register 25.

The output M of the control logic 30 is a logic 0 to cause the first multiplexer 21 to couple the output of the ring input register 15 to the input of the ring output register 24 and to cause the second multiplexer 22 to couple the output of the transfer input register 16 to the input of the transfer output register 25. The multiplexer control signal M is a logic 1 to cause the output of the ring input register 15 to be coupled to the input of the transfer output register 25 and also to cause the output of the transfer input register 16 to be coupled to the input of the ring output register 24.

Signal $G_2$ which is a logic 1 during a clock pulse will change to a logic 0 upon termination of the clock pulse only if a word is to be loaded into the transfer output register 25, whether from the ring input register 15 or the transfer input register 16. Also upon termination of a clock pulse the signal $G_1$ changes from a logic 1 to logic 0 only if a word was present in the transfer input register 16 and has been loaded into either the ring output register 24 or the transfer output register 25. The signal $G_1$ triggers the flip-flop 17 so as to change the status bit $S_1$ in the transfer input register 16 from a logic 1 to logic 0. Thus, until the status bit is replaced, $S_{1i}$ is logic 0 preventing the contents of the transfer input register from being loaded into an output register more than once. On receipt of the next word on incoming bus $T_{1i}$, the accompanying status bit of logic 1 sets the flip-flop 17 so that it presents a logic 1 at the input to the transfer input register 16.

The switching stage as illustrated operates during an operating cycle of a clock pulse when no word has been presented over either of the incoming buses $T_{Xi}$ or $T_{1i}$ to load nothing into either of the output registers 24 and 25 and thus transmits no information on outgoing buses $T_{Xo}$ and $T_{1o}$, as illustrated for condition 1 in the table of FIG. 3. Under condition 2 a word is loaded into the ring input register 15 on the leading edge of a clock pulse and the address of the word is not the address of the switching stage. The word is loaded into the ring output register 24 for transmittal over the outgoing bus $T_{Xo}$ to the succeeding switching stage. Under condition 3 a word is loaded into the ring input register 15 and is identified as being addressed to the switching stage. The word is loaded into the transfer output register 25 at the termination of the clock pulse and is available for transmission on bus $T_{1o}$. No information is loaded into the ring output register 24 or transmitted to the succeeding switching stage.

Under condition 4 a word is loaded into the transfer input register 16 from the incoming bus $T_{1i}$ and there is no word loaded into the ring input register 15. The word is coupled from the transfer input register 16 through the first multiplexer 21 to the ring output register 24 for placing on the ring bus $T_{Xo}$ to the succeeding switching stage. A $G_1$ bit of logic 0 is also produced resetting flip-flop 17 and thus preventing the contents of the transfer input register 16 from being processed more than once.

Under condition 5 a word is loaded into the ring input register 15 and a word is also loaded into the transfer input register 16 on the leading edge of a clock pulse, the word in the ring input register 15 not being addressed to the switching stage. The control logic 30 causes the first multiplexer 21 to couple the word in the ring input register 15 to the ring output register 24 for loading therein upon termination of the clock pulse. Since under these conditions the $G_2$ signal remains at logic 1, nothing is loaded into the transfer output register 25. The word in the transfer input register 16 remains in that register and is available to be transferred to the ring output register 24 during the first subsequent clock period in which there is no word is being passed from the ring input register 15 to the ring output register 24.

In the event that the word stored in the ring input register 15 is addressed to the switching stage as indicated under condition 6, M signal of logic 1 causes the multiplexers 21 and 22 to couple the contents of the ring input register 15 to the transfer output register 25 and the contents of the transfer input register 16 to the ring output register 24. The trailing edge of the clock pulse latches the ring output register 24 and causes the $G_2$ signal to become logic 0 latching the transfer output register 25. At the same time the $G_1$ signal becomes logic 0 triggering the flip-flop 17 to reset the status bit $S_{1i}$ to logic 0 so that the contents of the transfer input register 16 cannot be loaded into an output register during subsequent clock pulses.

Conditions 7, 8, and 9 pertain to the presence of a word in the transfer input register 16 which is identified by the transfer address means 35 and comparator 36 as one to be passed to the outgoing bus $T_{1o}$. Under condition 7 with no word placed in the ring input register 15, the second multiplexer 22 couples the contents of the transfer input register 16 to the transfer output register 25 for loading therein on the $G_2$ logic 0 signal. A logic 0 $G_1$ signal prevents further use of the contents of the transfer input register 16.

Under condition 8 a word is also placed in the ring input register 15 but is not addressed to the address of the switching stage. The two multiplexers 21 and 22 cause the contents of the ring input register 15 to be coupled to the ring output register 24 and cause the contents of the transfer input register 16 to be coupled to the transfer output register 25, respectively. The trailing edge of the clock pulse and the $G_2$ signal becoming logic 0 latch the output registers 24 and 25, and a logic 0 $G_1$ signal resets the flip-flop 17.

Under condition 9, the word stored in the ring input register 15 is addressed to the switching stage. Multiplexer 22 causes the contents of the ring input register 15 to be loaded into the transfer output register 25 when the $G_2$ signal becomes logic 0. The word remains in the transfer input register 16 for transmittal on a subsequent clock pulse.

As illustrated in the timing diagram of FIG. 4, the input registers 15 and 16 are latched on the leading edge of each clock pulse to load the words present at their inputs, if any. The various resulting signals $S_{Xi}$, $S_{1i}$, $X=$, and $1=$ are coupled to the control logic 30. A sufficient decode period is provided for the control logic 30 to decode the received information so that all the output signals $S_{Xo}$, $S_{1o}$, M, and the signals to OR gates 41 and 42 are stabilized before the termination of the clock pulse. The OR gates 41 and 42 are inhibited during the clock pulse insuring that logic 0 signals for $G_1$ and $G_2$ are not generated until the trailing edge of the clock pulse. There are no other critical timing relationships internally of the switching stage. The period between the trailing edge of one clock pulse and the leading edge of the next clock pulse is such as to allow for propagation delay from each switching stage to the succeeding switching stage along the ring bus.

With the apparatus as shown, each word includes address bits to identify its destination switching stage in the ring. Alternatively, the address bits may be included in only the first word of a message. The switching stage would include a counter which counts through N (the number of switching stages) clock pulses and transfers a word off the ring every Nth clock pulse.

The network and switching stages as described provide a truly distributed switching network in which each of the switching stages operates independently of all the others except for the common clock. The capacity of the network is limited only by the number of switching stages and the clock speed. There are no common control or stored program control limitations. The simplicity of the logic at each node permits each stage to be small and highly integrated. The stages can, therefore, be physically placed close together with short connecting paths. Consequently the load on the output of each stage is low and propagation delay through the network is low. The propagation delay within each switching stage is one clock period. In addition, the network provides for expansion in that the switching stages are regenerative and connected in series so that the loading on output driver circuits of each switching stage does not limit further expansion as would be the case if the switching stages were connected to a common bus rather than in series in a ring configuration.

While there has been shown and described what is considered a preferred embodiment of the present invention, it will be obvious to those skilled in the art that various changes and modifications may be made therein without departing from the invention as defined by the appended claims.

What is claimed is:

1. Time division multiplexed switching apparatus including a plurality of switching stages arranged in a closed ring with ring bus means connecting each switching stage to the preceding switching stage of the ring and to the succeeding switching stage of the ring, each switching stage being designated by a unique address, and words of digitally encoded information being transmitted from one switching stage to the succeeding switching stage at a first data rate; each switching stage comprising a ring input storage means coupled to the ring bus means for receiving and storing a word of digitally encoded information transmitted over the ring bus means from the preceding switching stage, the ring input storage means having an input coupled to the ring bus means from the preceding switching stage and having an output;

a transfer input storage means for receiving and storing a word of digitally encoded information to be transferred onto the ring, said transfer input storage means having an input coupled to a transfer input bus and having an output;

a ring output storage means for storing a word of digitally encoded information, said ring output storage means having an input and having an output coupled to the ring bus means to the succeeding switching stage;

a transfer output storage means for storing a word of digitally encoded information, said transfer output storage means having an input and an output;

first multiplexing means having a first input coupled to the output of the ring input storage means, a second input coupled to the output of the transfer input storage means, and an output coupled to the input of the ring output storage means;

second multiplexing means having a first input coupled to the output of the ring input storage means, a second input coupled to the output of the transfer input storage means, and an output coupled to the input of the transfer output storage means;

means for producing clock signals at said first data rate;

said ring input storage means being operable to store a word received on the ring bus means from the preceding switching stage on the leading edge of each clock signal;

address means for determining if a word stored in the ring input storage means is addressed to the address of the switching stage;

said transfer input storage means being operable to store a word received on the transfer input bus on the leading edge of a clock signal;

control means coupled to said first and second multiplexing means and operable when a word is stored in the ring input storage means and the address means determines that the stored word is not addressed to the address of the switching stage to cause the first multiplexing means to couple the output of the ring input storage means to the input of the ring output storage means;

said control means being operable when a word is stored in the ring input storage means and the address means determines that the stored word is addressed to the address of the switching stage to cause the second multiplexing means to couple the output of the ring input storage means to the input of the transfer output storage means;

said control means being operable when a word is stored in the transfer input storage means, unless a word is stored in the ring input storage means and the address means determines that the word stored in the ring input storage means is not addressed to the address of the switching stage, to cause the first multiplexing means to couple the output of the transfer input storage means to the input of the ring output storage means;

said ring output storage means being operable in response to the termination of a clock signal to store a word present at its input; and said transfer output storage means being operable in response to the termination of a clock signal to store a word present at its input.

2. Time-division multiplexed switching apparatus in accordance with claim 1 including inhibiting means coupled to said transfer input storage means and to said control means for preventing a word stored in the transfer input storage means and loaded into the ring output storage means during a clock signal from being reloaded into the ring output storage means during a subsequent clock signal.

3. Time-division multiplexed switching apparatus in accordance with claim 2 wherein each of said words of digitally encoded information is associated with status data which indicates the presence or the absence of a word;

said ring input storage means being operable to store status data which indicates the presence or the absence of a word in the ring input storage means on the leading each of each clock signal;

said transfer input storage means being operable to store status data associated with a word stored in the transfer input storage means;

said address means, said ring input storage means, and said transfer input storage means being coupled to said control means;

said control means being operable to produce a first multiplexer control signal to said first and second multiplexing means when the status data in the ring input storage means indicates the presence of a word in the ring input storage means and the address means determines that the stored word is not addressed to the switching stage;

said control means being operable to produce a second multiplexer control signal to said first and second multiplexing means when the status data in the ring input storage means indicates the presence of a word in the ring input storage means and the address means determines that the stored word is addressed to the switching stage, and to produce the second multiplexer control signal to said first and second multiplexing means when the status data in the ring input storage means indicates the absence of a word in the ring input storage means and the status data in the transfer input storage means indicates the presence of a word in the transfer input storage means;

said first multiplexing means being operable to couple the output of the ring input storage means to the input of the ring output storage means in response to said first multiplexer control signal;

said first multiplexing means being operable to couple the output of the transfer input storage means to the input of the ring output storage means in response to said second multiplexer control signal; and said second multiplexing means being operable to couple the output of the ring input storage means to the input of the transfer output storage means in response to said second multiplexer control signal.

4. Time-division multiplexed switching apparatus in accordance with claim 3 wherein said control means is coupled to said transfer output storage means and is operable to produce a loading signal thereto upon the termination of a clock signal in response to status data from the ring input storage means indicating the presence of a word stored therein and the address means determines that the word stored in the ring input storage means is addressed to the address of the switching stage; and said transfer output storage means is operable in response to the leading edge of a loading signal to store a word present at its input.

5. Time-division multiplexed switching apparatus in accordance with claim 4 wherein said control means is operable to produce a reset signal on the trailing edge of a clock signal during which a word stored in the transfer input storage means is loaded into the ring output storage means; and said inhibiting means is operable in response to said reset signal to change the status data stored in the transfer input storage means to indicate the absence of a word stored in the transfer input storage means whereby the stored word is prevented from being loaded into the ring output storage means during a subsequent clock cycle.

6. Time-division multiplexed switching apparatus in accordance with claim 5 wherein said inhibiting means has an input for receiving status data associated with a word on the transfer input bus and an output coupled to the transfer input storage means;

said inhibiting means being operable in response to status data indicating the presence of a word on the transfer input bus to set the inhibiting means to produce status data at its output indicating the presence of a word at the transfer input bus for loading into the transfer input storage means on the leading edge of the next clock signal; and said inhibiting means being operable in response to a reset signal from said control means to reset the inhibiting means to produce status data at its output indicating the absence of a word for loading into the transfer input storage means on the leading edge of the next clock signal.

7. Time-division multiplexed switching apparatus in accordance with claim 6 wherein words of digitally encoded information are received at the transfer input storage means at a second data rate which is equal to the first data rate divided by the number of switching stages in said plurality of switching stages arranged in the closed ring.

8. Time-division multiplexed switching apparatus including a plurality of switching stages arranged in a closed ring with ring bus means connecting each switching stage to the preceding switching stage of the ring and to the succeeding switching stage of the ring, each switching stage being designated by a unique address, and words of digitally encoded information being transmitted from one switching stage to the succeeding switching stage at a first data rate; each switching stage comprising a ring input storage means coupled to the ring bus means for receiving and storing a word of digitally encoded information transmitted over the ring bus means from the preceding switching stage, the ring input storage means having an input coupled to the ring bus means from the preceding switching stage and having an output;

a transfer input storage means for receiving and storing a word of digitally encoded information, said transfer input storage means having an input coupled to a transfer input bus and having an output;

a ring output storage means for storing a word of digitally encoded information, said ring output storage means having an input and having an output coupled to the ring bus means to the succeeding switching stage;

a transfer output storage means for storing a word of digitally encoded information, said transfer output storage means having an input and an output;

first multiplexing means having a first input coupled to the output of the ring input storage means, a second input coupled to the output of the transfer input storage means, and an output coupled to the input of the ring output storage means;

second multiplexing means having a first input coupled to the output of the ring input storage means, a second input coupled to the output of the transfer input storage means, and an output coupled to the input of the transfer output storage means;

means for producing clock signals at said first data rate;

said ring input storage means being operable to store a word received on the ring bus means from the preceding switching stage on the leading edge of each clock signal;

switching stage address means for determining if a word stored in the ring input storage means is addressed to the address of the switching stage;

said transfer input storage means being operable to store a word received on the transfer input bus on the leading edge of a clock signal;

transfer address means for determining if a word stored in the transfer input storage means is to be transferred to the ring output storage means or to the transfer output storage means;

control means coupled to said first and second multiplexing means and operable when a word is stored in the ring input storage means and the switching stage address means determines that the stored word is not addressed to the address of the switching stage to cause the first multiplexing means to couple the output of the ring input storage means to the input of the ring output storage means;

said control means being operable when a word is stored in the ring input storage means and the switching stage address means determines that the stored word is addressed to the address of the switching stage to cause the second multiplexing means to couple the output of the ring input storage means to the input of the transfer output storage means;

said control means being operable when a word is stored in the transfer input storage means and the transfer address means determines that the word stored in the transfer input storage means is to be transferred to the ring output storage means, unless a word is stored in the ring input storage means and the switching stage address means determines that the word stored in the ring input storage means is not addressed to the address of the switching stage, to cause the first multiplexing means to couple the output of the transfer input storage means to the input of the ring output storage means;

said control means being operable when a word is stored in the transfer input storage means and the transfer address means determines that the word stored in the transfer input storage means is to be transferred to the transfer output storage means, unless a word is stored in the ring input storage means and the switching stage address means determines that the word stored in the ring input storage means is addressed to the address of the switching stage, to cause the second multiplexing means to couple the output of the transfer input storage means to the input of the transfer output storage means;

said ring output storage means being operable in response to the termination of a clock signal to store a word present at its input; and said transfer output storage means being operable in response to the termination of a clock signal to store a word present at its input.

9. Time-division multiplexed switching apparatus in accordance with claim 8 including means coupled to said transfer input storage means and to said control means for preventing a word stored in the transfer input storage means and loaded into the ring output storage means during a clock signal from being reloaded into the ring output storage means during a subsequent clock signal.

10. Time-division multiplexed switching apparatus in accordance with claim 9 wherein each of said words of digitally encoded information is associated with status data which indicates the presence or the absence of a word;

said ring input storage means being operable to store status data which indicates the presence or the absence of a word in the ring input storage means on the leading each of each clock signal;

said transfer input storage means being operable to store status data associated with a word stored in the transfer input storage means;

said switching stage address means, said transfer address means, said ring input storage means, and said transfer input storage means being coupled to said control means;

said control means being operable to produce a first multiplexer control signal to said first and second multiplexing means when the status data in the ring input storage means indicates the presence of a word in the ring input storage means and the switching stage address means determines that the stored word is not addressed to the switching stage;

said control means being operable to produce a second multiplexer control signal to said first and second multiplexing means when the status data in the ring input storage means indicates the presence of a word in the ring input storage means and the switching stage address means determines that the stored word is addressed to the switching stage;

said control means being operable to produce the second multiplexer control signal to said first and second multiplexing means when the status data in the ring input storage means indicates the absence of a word in the ring input storage means, the status data in the transfer input storage means indicates the presence of a word in the transfer input storage means, and the transfer address means determines that the word stored in the transfer input storage means is addressed to the ring output storage means;

said first multiplexing means being operable to couple the output of the ring input storage means to the input of the ring output storage means in response to said first multiplexer control signal;

said first multiplexing means being operable to couple the output of the transfer input storage means to the input of the ring output storage means in response to said second multiplexer control signal; and said second multiplexing means being operable to couple the output of the ring input storage means to the input of the transfer output storage means in response to said second multiplexer control signal.

11. Time-division multiplexed switching apparatus in accordance with claim 10 wherein said control means is coupled to said transfer output storage means and is operable to produce a loading signal thereto upon the termination of a clock signal in response to status data from the ring input storage means indicating the presence of a word stored therein and the switching stage address means determines that the word stored in the ring input storage means is addressed to the address of the switching stage; and said transfer output storage means is operable in response to the leading edge of a loading signal to store a word present at its input.

12. Time-division multiplexed switching apparatus in accordance with claim 11 wherein said control means is operable to produce a reset signal on the trailing edge of a clock signal during which a word stored in the transfer input storage means is loaded into the ring output storage means; and said inhibiting means is operable in response to said reset signal to change the status data stored in the transfer input storage means to indicate the absence of a word stored in the transfer input storage means whereby the stored word is prevented from being loaded into the ring output storage means during a subsequent clock cycle.

13. Time-division multiplexed switching apparatus in accordance with claim 12 wherein said inhibiting means has an input for receiving status data associated with a word on the transfer input bus and an output coupled to the transfer input storage means;

said inhibiting means being operable in response to status data indicating the presence of a word on the transfer input bus to set the inhibiting means to produce status data at its output indicating the presence of a word at the transfer input bus for loading into the transfer input storage means on the leading edge of the next clock signal; and said inhibiting means being operable in response to a reset signal from said control means to reset the inhibiting means to produce status data at its output indicating the absence of a word for loading into the transfer input storage means on the leading edge of the next clock signal.

14. Time-division multiplexed switching apparatus in accordance with claim 13 wherein words of digitally encoded information are received at the transfer input storage means at a second data rate which is equal to the first data rate divided by the number of switching stages in said plurality of switching stages arranged in the closed ring.

* * * * *